United States Patent [19]

Komanetsky et al.

[11] Patent Number: 4,733,975
[45] Date of Patent: Mar. 29, 1988

[54] UNITIZED HIGH TEMPERATURE PROBES

[75] Inventors: Frederick J. Komanetsky, Port St. Lucie; John A. Selstad, Indiantown, both of Fla.

[73] Assignee: The United States of America as represented by the Secretary of the Air Force, Washington, D.C.

[21] Appl. No.: 882,101

[22] Filed: Jul. 3, 1986

[51] Int. Cl.$^4$ .................. G01K 1/16; G01K 13/12
[52] U.S. Cl. .................. 374/144; 244/53 R; 415/118
[58] Field of Search ............ 374/144, 208; 136/230; 415/118; 244/53 R

[56] References Cited

U.S. PATENT DOCUMENTS

| | | | |
|---|---|---|---|
| 2,567,512 | 9/1951 | Freeman | 415/118 X |
| 3,000,213 | 9/1961 | Eves et al. | 374/138 |
| 3,011,004 | 11/1961 | Meador | 374/144 X |
| 3,067,577 | 12/1962 | Dew | 374/144 X |
| 3,167,960 | 2/1965 | Miesiak | 374/144 X |
| 3,348,414 | 10/1967 | Wafers et al. | 374/144 X |
| 3,512,414 | 5/1970 | Rees | 415/118 X |
| 3,788,143 | 1/1974 | Gabriel | 374/144 |
| 3,920,947 | 11/1975 | Wachtell et al. | 219/69 M |
| 3,963,894 | 6/1976 | Wachtell et al. | 219/69 E |
| 4,176,433 | 12/1979 | Lee et al. | 29/156.8 B |
| 4,467,134 | 8/1984 | Pustell | 374/144 X |
| 4,476,369 | 10/1984 | Inoue | 219/69 M |
| 4,487,671 | 12/1984 | McGeough | 204/129.1 |
| 4,524,259 | 6/1985 | Wolf et al. | 219/69 R |
| 4,572,677 | 2/1986 | Sehgal | 374/144 |

OTHER PUBLICATIONS

Standard Handbook for Mechanical Engineers, Baumeister & Marks, 1967, (7th Edition), McGraw Hill.

*Primary Examiner*—Daniel M. Yasich
*Attorney, Agent, or Firm*—Jules J. Morris; Donald J. Singer

[57] ABSTRACT

A unitized static sensor probe 20 for a gas turbine engine 10, machined from a single piece of raw material. The probe preferably has integral kiel cups 26 that form a part of the probe airfoil. The probe is manufactured by electrical discharge machining, and is shaped with an airfoil (53, 70) that minimizes disruption of the engine airstream. Integral air seal platforms 56, 58 and a mounting plate 54 are also provided.

12 Claims, 7 Drawing Figures

UNITIZED HIGH TEMPERATURE PROBES

STATEMENT OF GOVERNMENT INTEREST

The invention described herein may be manufactured and used by or for the Government for governmental purposes without the payment of any royalty thereon.

TECHNICAL FIELD

This invention relates to instrumentation suitable for high temperature environments and is particularly related to static sensor instrumentation suitable for gas turbine engines.

BACKGROUND OF THE INVENTION

Conventional probes for gas turbine engines are fabricated from a multitude of discrete parts. Generally, kiel heads (also called kiel cups) that surround static instrumentation are welded to a machined airfoil or duct through which instrumentation is routed. The airfoil or duct is welded to a plate that is mounted by bolts on the exterior skin of the engine.

The types of material suitable for use in these probes are limited because of the need to conventionally machine such probes with lathes, milling machines and other devices. Further, fabricated probes can be very intrusive on the engine airflow resulting in a loss of engine efficiency. This is a result of their relatively large size. Miniaturization of such probes is limited by conventional machining techniques. The use of a multitude of such large probes on test engines can degrade engine performance to a degree that the effects of engine improvements that should be detected by test instrumentation are obscured by the airflow disruption resulting from the test instrumentation.

Fabricated probes are also limited to relatively cool engine areas and cannot be positioned in the highest temperature, highest pressure engine areas. When placed in these areas fabricated metal probes with brazed or welded kiel heads tend to crack or deteriorate and losened probe material may subsequently damage the engine.

In view of the above a need exists for improved static probe instrumentation for high temperature, high pressure environments.

It is therefore an object of the present invention to provide an improved static sensor probe for use in high temperature, high pressure environments.

It is also an object of the invention to provide a probe that will be less intrusive on engine airflow then conventional probes.

SUMMARY OF THE INVENTION

The invention comprises a single piece metallic probe manufactured from high temperature material. The probe has integral kiel heads for static instrumentation and is formed in an airfoil shape that minimizes its negative effects on the engine flow stream. In the preferred embodiment of the invention the probe is manufactured by electrical discharge machining from a single piece of stock material.

Other aspects of the preferred embodiment of the invention comprise an integral platform for attachment of the probe to an engine housing and static sensors mounted in integral kiel heads positioned on the leading edge of the probe airfoil. It is also preferred that the probe be manufactured from a high temperature material such as an inconel nickel alloy.

In an alternate embodiment of the invention the probe body may be manufactured by a casting method such as powdered metallurgy and finished machined by electrical discharge machining.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

Figure 1:
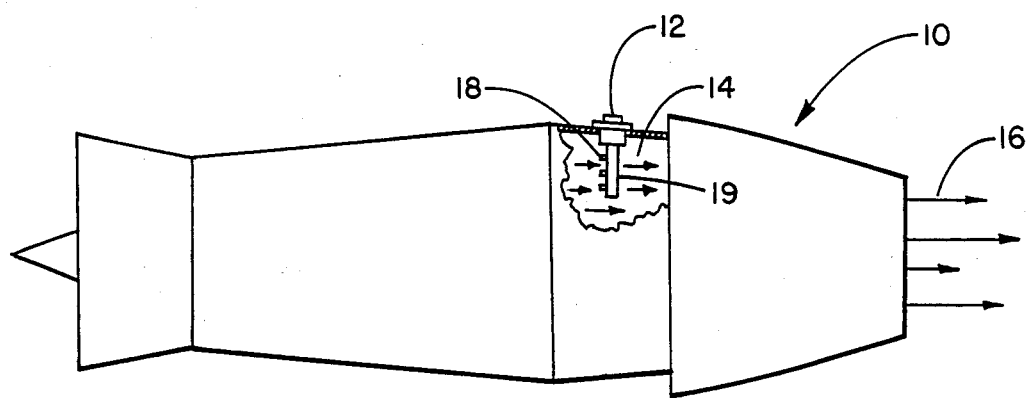
FIG. 1 is a schematic representation of a gas turbine engine in which a unitized probe is located.

FIG. 1 is a schematic representation of a gas turbine engine 10. A unitized probe 12 incorporating the principles of this invention has been installed in engine 10 in order to provide data concerning an airstream 14 passing through the engine and becoming a propelling exhaust stream 16. The probe has static pressure and/or static temperature sensors positioned in kiel heads 18 located on the leading edge of the airfoil 19 of probe 12. The static pressure and/or static temperature sensors are typically monitored at gauges or meters located at an aircraft flight deck or an engine test control area. The sensors are connected fluidly or electrically by leads to the monitoring area.

The kiel heads shield the instrumentation from flow stream therefor effects in order to produce valid static pressure and temperature data. Kiel heads shield thermocouples from surrounding radiation variations which might otherwise affect reading consistency. Alternatively, kiel heads provide a shielded area surrounding static pressure sensors so that airstream changes and turbulence will not unduly affect static pressure readings.

Figure 2:
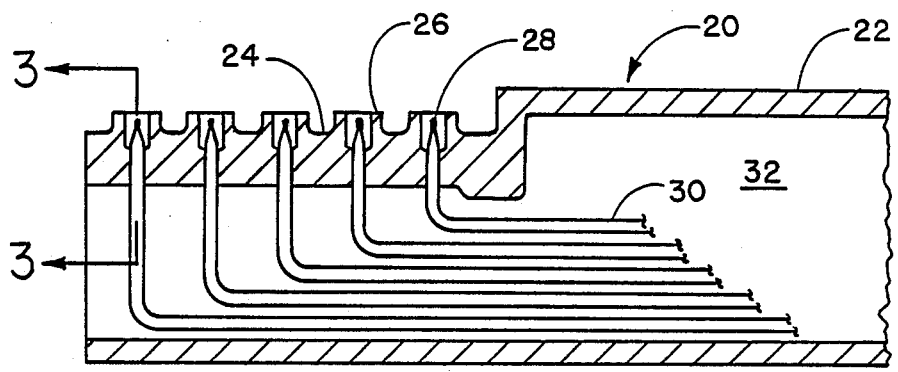
FIG. 2 is a cross sectional representation of a section of a unitized probe embodying the principles of this invention.
Figure 3:
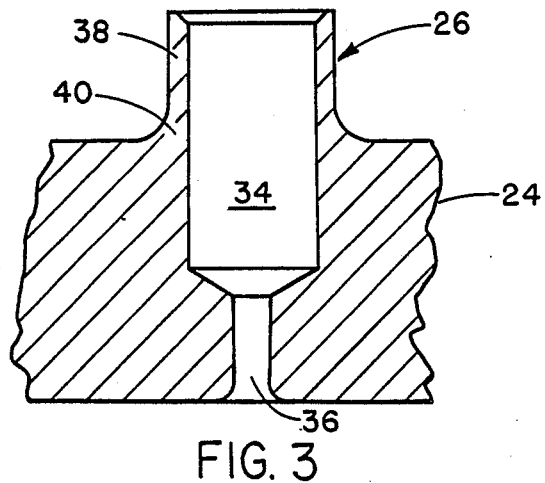
FIG. 3 is an enlarged partial cross section of the probe of FIG. 2 taken along lines 3—3.

The invention may be more readily understood with reference to the enlarged views of FIGS. 2 and 3. FIG. 2 is a cross section of a portion of a unitized probe 20. The probe 20 has an airfoil 22 with a recessed portion 24, at the recessed portion five integral kiel heads 26 have been positioned. Static pressure sensors (or static temperature sensors) 28 are positioned in each of the kiel heads 26 and are connected by leads 30 to a hollow section 32 of the probe from which they can be routed to the exterior of the engine and connected to data recording means.

An enlarged view of a kiel head 26 is shown in FIG. 3. The kiel head 26 comprises a sensor placement area 34 and a connecting channel 36 through which the instrumentation is routed away from the kiel head. Kiel head walls 38 are integral with the body of the probe 24 and have smooth transitions (chamfers or fillets) 40 that add strength to the keil head and help to smooth the flow stream in the vicinity of the kiel head and airfoil interface.

Figure 3A:
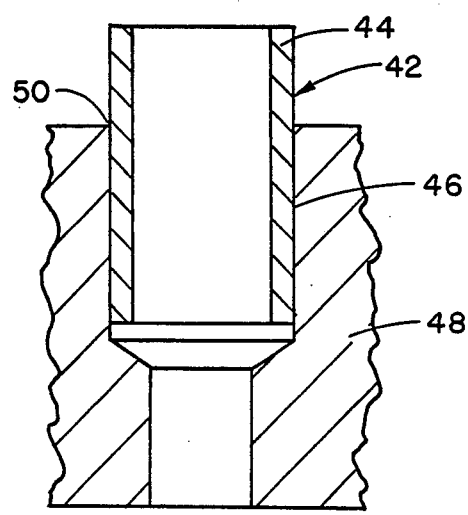
FIG. 3a is a partial cross section of a conventional probe similar to the probe of FIG. 3, it is labelled "Prior Art"

For comparison purposes a conventional kiel head 42 is shown in the cross section of FIG. 3a. In this view a kiel head section 44 is brazed or welded into a hole 46 drilled in the body of a probe 48. Probe body thickness must therefore be increased to accept the hole and kiel head section 44. In addition the interface 50 between the kiel head 42 and probe body 48 is a sharp corner that disrupts the flow stream in the vicinity of interface. Further, sharp corners such as these are more susceptible to cracking that smooth transitions or chamfers. Probe 48 must also be made larger than integral probe 20 in order to provide a structurally satisfactory kiel head and probe combination that is capable of withstanding operational engine stresses.

Electrical discharge machining (EDM) allows for the manufacture of smaller probes than those fabricated from discrete components. It also allows for an increase in the conformance of probes with smooth airflow requirements.

Figure 4:
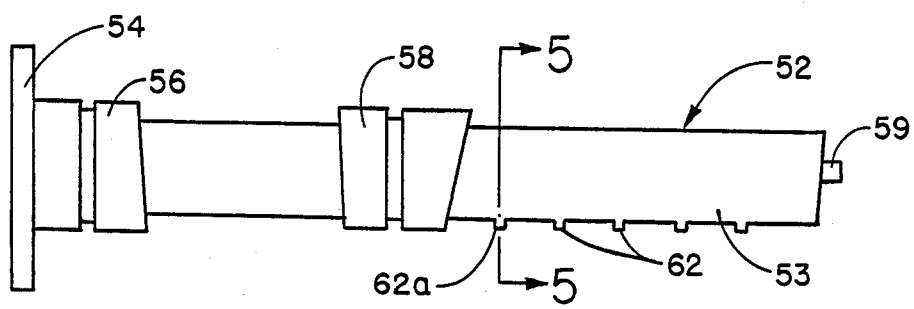
FIG. 4 is a plan view of a second unitized probe embodying the principles of this invention.
Figure 5:
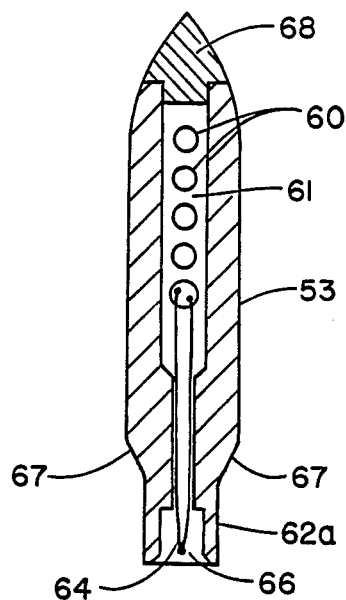
FIG. 5 is a cross section of a portion of the probe of FIG. 4 taken along line 5—5.

Further advantages of unitized probes can be readily understood with reference to FIGS. 4 and 5 which show a second type of static sensor probe similar to that disclosed above. A unitized probe 52 is shown in a plan view in FIG. 4. The probe has a mounting plate 54 for attachment to the outer skin of an aircraft engine and a locating pin 59 then is used for positioning the probe in the engine as it is secured. The probe further comprises air seal platform 56 which seals an outer air flow path from the outside environment and platform 58 which seals the outer air flow path from an inner air flow path.

FIG. 5 is a cross section of unitized probe 52 taken along line 5—5 of FIG. 4. In this cross section the five sensor lines 60 are shown traveling through a sensor routing area 61 of the probe airfoil 53. The sensor lines 60 each terminate with instrumentation at a kiel head 62. In the view of FIG. 5 a kiel head 62a is shown in cross section. The terminating section of a static temperature probe 64 is shown centered in the sensor placement area 66 of kiel head 62a. Each of the remaining static temperature or static pressure sensors that terminates from lines 60 would be similarly centered in the remaining kiel heads 62. The kiel heads 62 are blended smoothly into airfoil 53 with softly rounded transition sections 67. This strenthens the structural integrity of the kiel cup and aides in preventing disruption of the engine flow stream that might otherwise effect engine efficiency.

In some instances it may be desirable to cap the trailing edge of the probe with a cap portion 68. This cap portion can either conform to airstream requirements or merely be a filler to close off and prevent inadvertent damage to the instrumentation channel 61. In some instances the cap 68 would not be required at all.

Figure 6:
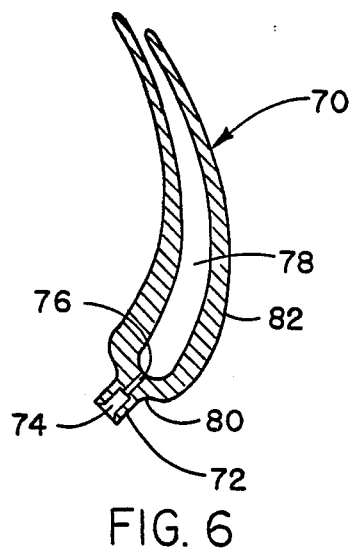
FIG. 6 is a cross section of a embodiment of the probe having an airfoil conforming to a desired vane shape.

FIG. 6 shows yet another embodiment of a unitized instrumentation probe similar to the probes of FIGS. 4 and 5. The plan view of the probe 70 of FIG. 6 can be considered to be the same as FIG. 4 showing probe 52. In the view of FIG. 6 the probe airfoil conforms to that of vanes that would typically be placed in the engine airstream. As a result, the instrumentation probe can be made permanent since it has negligible effects on engine efficiency. The probe 70 is operationally equivalent to other vanes placed at the same engine location and serves as a functional engine part.

The probe shape shown in FIG. 8 can not be achieved by conventional probe manufacturing techniques. It is only through the use of EDM machining and unitized probes that such special shapes can be easily devised. If it is preferred that castings be used, finish machining would preferably be done by the EDM method in order to achieve the small holes required for placing the instrumentation in a kiel head. In either case, use of the unitized probe of this invention permits probes to be constructed for use in an engine as functional parts rather than inert intrusions on the airstream.

The probe 70 has a kiel head 72 having a sensor placement area 74 and a connecting channel 76 to a central instrumentation routing area 78. As shown in the view of FIG. 6 no cap would be required at the trailing edge of a probe with this airfoil shape. The kiel head and probe have been specially devised to have the minimum negative effect on the airstream. The kiel head has a very shallow chamfer 80 which flows into the airfoil surface 82 of the probe 70. This chamfer helps reduce air flow turbulence in the vicinity of the kiel head as well as adding structural strength.

The probe of FIG. 6 demonstrates that it is possible to build probes into engine areas as functional parts rather than specialized probes that are inert. Probes such as probe 70 can be used to direct air flow in a positive manner that increases engine efficiency. Further since these probes can be made of much higher strength material than probes manufactured from discrete parts by brazing and welding they can be made much smaller. Unitized probes can be used in the high temperature and high pressure engine areas. Static pressure and temperature probes can therefore be inserted at the higher compressor stages and in turbine areas where it was previously impossible.

The comparison between FIGS. 3 and 3a demonstrates that unitized probes can be made with a thinner airfoil or cross section then conventional probes. This gives the user the ability to put static pressure or temperatures probes in more confined places than ever before possible. For example, in the high pressure compressor stages of most aircraft engines small blades and vanes are generally used, vane-like sensor probes made in the conventional manner are too large and too fragile for placement in these stages. Small unitized probes, however, can replace selected vanes at such locations and operate successfully for long periods. This is as a result of the miniaturization and increased structural stability of unitized probes. In addition, conventional probes are highly intrusive on the airstream and reduce engine efficiency significantly. Small unitized probes of high temperature material are therefore much more suitable for use in high pressure engine stages.

Examples of materials from which unitized probe can be manufactured include the inconel series of nickel alloys that are known for their high strength and their ability to withstand very high temperatures. Parts made from inconel 625, for example, can withstand up to 1800° F. It is also possible to use the hastelloy series of nickel alloys. This series of metals is capable of withstanding higher temperatures than most the inconel series metals, temperatures which are achieved in the turbine area of the engine. Parts made from hastelloy X for example, are capable of withstanding up to 2000° F.

Finally, IN 100 has also proven a suitable material for manufacture of unitized probes and is capable of withstanding temperatures up to 1900° F. In instances where the structural strength of the probe must be increased to that approaching or surpassing vanes at similar locations single crystal material can also be used.

While the invention has been particularly described with reference to the preferred embodiments thereof, it will be understood by those skilled in the art that various changes in substance and form may be made therein without having departed from the spirit and the scope of the invention as detailed in the attached claims. For example, a multitude of specially shaped unitized probes with integral kiel heads can be constructed in order to minimize the effect of instrumentation on engine airflow. Further, when vane and vane-like shapes are required they should not be limited to those disclosed in reference to the Figures. As is well known, there are a multitude of variations in vane shapes and angles; these can be substantially duplicated with a unitized probe of this invention.

We claim:

1. An instrumentation probe for holding and shielding static sensors in a flow stream, the instrumentation probe comprising:
    (a) a probe body, aerodynamically shaped to be non-disruptive of the flow stream and manufactured from a single piece of metal;
    (b) multiple kiel heads protruding into the flow stream in order to shield static sensors, the kiel heads formed as an integral part of said probe body and having smooth transitioning outer surfaces connecting said kiel heads to said probe body;
    (c) an instrumentation cavity formed within said probe body,
    (d) static sensors positioned within said instrumentation cavity and said kiel heads;
    (e) a mounting flange forming a part of said probe body for mounting said instrumentation in the flow stream; and
    (f) an exit area for sensor leads to facilitate connection of said sensors to data recording means.

2. The instrumentation probe of claim 1 wherein said probe comprises a high temperature nickel alloy.

3. The instrumentation probe of claim 1 wherein said instrumentation cavity comprises a complex multibranched cavity formed by electrical discharge machining.

4. The instrumentation probe of claim 1 wherein said probe body is cast.

5. The instrumentation probe of claim 1 wherein said probe body substantially corresponds in shape to an engine vane.

6. The instrumentation probe of claim 1 wherein said keil cups further comprise chamfers for the smooth transitioning of airflow between said probe body and bases of said kiel cups.

7. An instrumentation probe comprising a single piece metallic probe body which comprises an aerodynamically shaped probe airfoil and at least two kiel cups protruding into a flow stream for shielding static instrumentation and wherein the kiel cups are formed integral with said probe airfoil, wherein said probe body comprises a multibranched internal instrumentation cavity and is formed by electrical discharge machining of a single piece of raw material.

8. The instrumentation probe of claim 7 further comprising an integral flange for attachment of the engine housing.

9. The instrumentation probe of claim 7 further comprising a static pressure sensor positioned within said kiel cup.

10. The instrumentation probe of claim 7 further comprising a static temperature sensor positioned within said kiel cup.

11. The instrumentation probe of claim 7 wherein said probe body comprises a multitude of kiel cups containing a multitude of sensors.

12. The instrumentation probe of claim 7 wherein said probe comprises a high temperature nickel alloy.

* * * * *